B. M. W. HANSON.
CLUTCH.
APPLICATION FILED AUG. 6, 1919.
1,381,990.
Patented June 21, 1921.
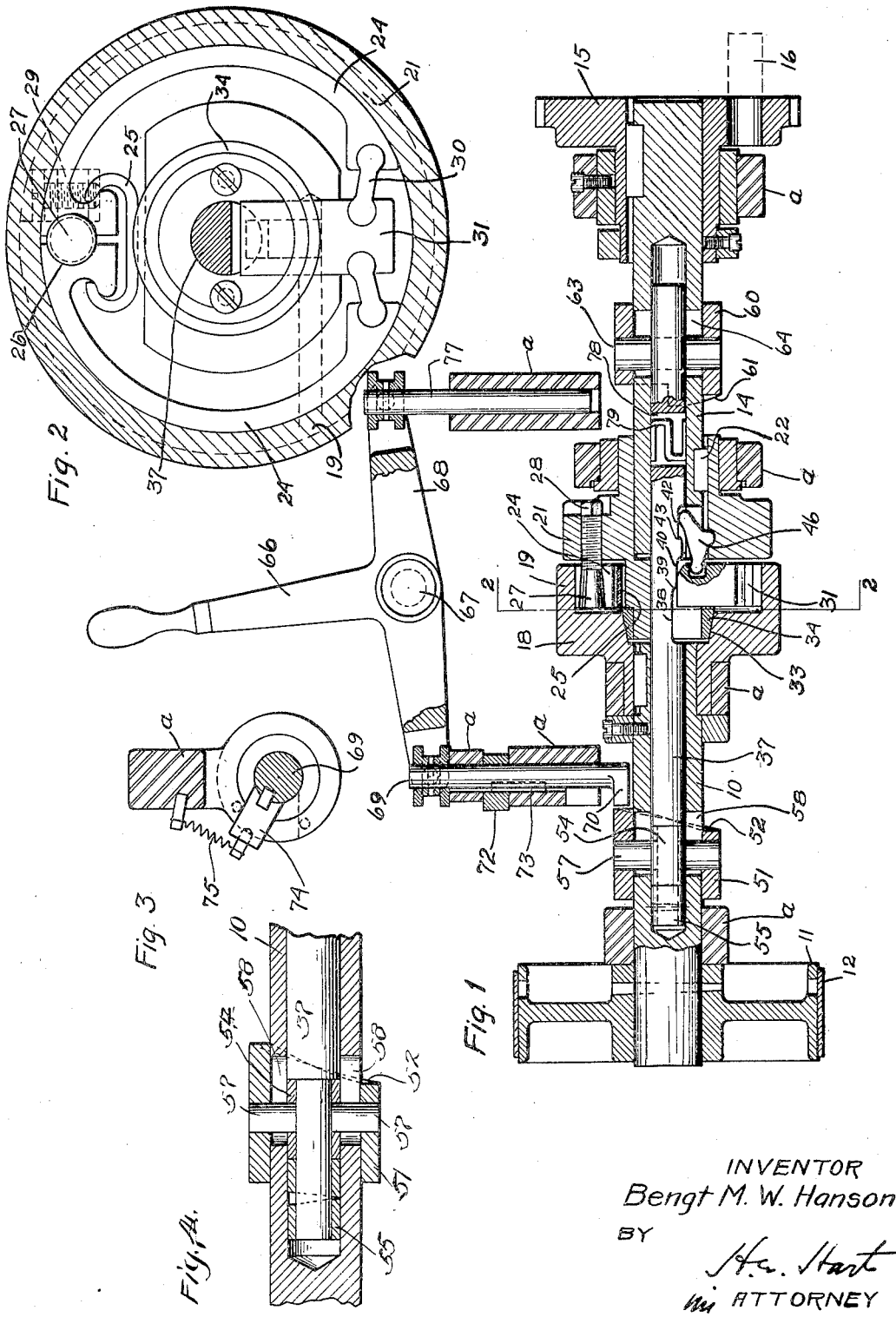
INVENTOR
Bengt M. W. Hanson
BY
*H. C. Hart*
his ATTORNEY

UNITED STATES PATENT OFFICE.

BENGT M. W. HANSON, OF HARTFORD, CONNECTICUT.

CLUTCH.

1,381,990.  Specification of Letters Patent.  Patented June 21, 1921.

Application filed August 6, 1919. Serial No. 315,668.

*To all whom it may concern:*

Be it known that I, BENGT M. W. HANSON, a citizen of the United States, and a resident of Hartford, county of Hartford, State of Connecticut, have invented certain new and useful Improvements in Clutches, of which the following is a specification.

It is an object of the present invention to provide a clutch having features of novelty and advantage and particularly to provide an improved clutch wherein the parts are thrown into and out of operation by the power driving the clutch members so that little or no manual effort is required and the apparatus to which my clutch is applied may be started and stopped with precision.

My improved clutch is simple and strong in construction, and noiseless, efficient and reliable in operation.

In the accompanying drawings:

Figure 1 is a longitudinal section through one embodiment of my improved clutch.

Fig. 2 is a view taken substantially on line 2—2 of Fig. 1 and showing the expansible clutch member in end elevation.

Fig. 3 is an enlarged view showing a detail of construction and

Fig. 4 is a sectional view on an enlarged scale showing the manner in which one of the cam sleeves is connected to the rod 37.

It is, of course, understood that the present disclosure of one embodiment of my invention is by way of illustration only and it is not to be taken as restrictive of my conception, as my invention is susceptible of various modifications and changes. As my improved clutch is applicable for general use, I have not illustrated it, in the accompanying drawing, as applied to any specific type of machine. In this drawing, the members designated by the letter $a$ are stationary supporting parts and, for the purpose of clearness, all of these parts are similarly cross-hatched.

The numeral 10 designates a driving member, which by way of example, is illustrated as comprising a rotatable shaft having at one end a pulley 11 about which a drive belt 12 passes. The numeral 14 designates the driven member comprising a shaft in axial alinement with the shaft 10 and having at one end any suitable means for giving desired movement to a movable part, this means depending, of course, upon the use to which
my clutch is applied. In the present in-
stance, I have shown this means as comprising a disk 15 having an eccentrically disposed pin 16 to which may be secured a rod (not shown) carrying a stamping head or other member to be reciprocated.

Fixedly secured to the driving member 10 is one of the clutch members comprising a disk 18 having a cylindrical flange 19, the internal periphery of which forms a friction surface against which the other clutch member is adapted to be brought into engagement.

The numeral 21 designates a carrier secured to the driven shaft 14 by means of a key 22 so that the carrier and shaft rotate in unison. Secured to the carrier 21 is the other clutch member comprising, in the present instance, an expansible ring formed of two parts 24 fitting within the recess formed by the flange 19 and hingedly and resiliently secured together at one end by means of a spring 25, as illustrated most clearly in Fig. 2. The spring 25 has its ends turned inwardly toward each other and these inturned ends grip between them the projections on the parts 24. The adjacent hinged ends of the parts 24 have opposed semi-circular recesses 26, the walls of which are tapered to form a tapering opening which receives a correspondingly tapered portion 27 of an adjusting bolt 28 screwed into a threaded opening in the carrier 21. By means of this arrangement, it is only necessary, to take up wear between the parts, to turn the bolt 28 in a direction to draw the tapering portion 27 farther into the opening formed by the recesses 26. If desired, the bolt 27 may be secured in adjusted position by a movable block 29 located in a recess in the carrier 21, (see Fig. 2.) The means for expanding the ring 24 comprises a slide 31 radially movable in a slot in the carrier 21 and for illustrative purposes this slide is shown as acting on the parts 24 through the links 30. The links 30 together with the slide 31 form a toggle-joint such that when the slide is moved outwardly the parts 24 are expanded so that the outer circumferences thereof are brought into frictional engagement with the internal periphery of the flange 19 and when the slide is moved inwardly, the parts 24 are moved out of engagement with the flange 19. For the purpose of centering the clutch members, the disk 18 has a recess 33 the walls of which are tapered and the carrier 21 has a corresponding frusto-conical shaped bushing 34 which engages the tapering walls of the recess 33 when the clutch members are thrown into engagement.

The means for actuating or moving the slide 31 radially comprises a shiftable bar 37. The opposed ends of the driving and driven members are axially bored or recessed to receive this shiftable bar 37 which has a recess 38, a cam surface 39 and a land 40 so arranged that when the bar 37 is in one position the inner end of the slide 31 may move into the recess 38 to release the clutch and, when the bar is moved out of this position, the cam surface 39 wipes against the slide to move the slide outwardly and apply the clutch. The slide is held in this outer position by the land 40. The shiftable bar also has a recess 42 and a cam surface 43. The numeral 46 designates a rocking-dog having a seat in the carrier 21 and one end of this dog coöperates with the cam surface 43 and the other end of the dog is positioned in a recess in the side of the slide 31 so that, when the bar 37 is shifted to the right in Fig. 1, the cam surface 43 will rock the dog and cause the slide 31 to move inwardly.

For the purpose of shifting the bar 37 in a direction to throw the clutch members into engagement, a sleeve 51 having at one end a cam surface 52, is rotatably carried by and is longitudinally movable of the driving member 10, and this sleeve is connected to the rod 37 so as to move longitudinally therewith but rotate independently thereof. The forward end of the bar 37 is of reduced diameter and carries a loose bushing 54 fixed against longitudinal movement therealong by means of a collar 55 secured upon the outer end of the rod 37 by means of a pin as shown. Extending radially from the bushing 54 are pins 57 which pass through slots 58 in the driving member 10 and to the outer end of these pins the sleeve 51 is secured.

For the purpose of shifting the rod 37 in a direction to throw the clutch members out of engagement, a sleeve 60 having a cam surface 61 is positioned about the driven member 14 and is secured to the bar 37 so as to rotate and move longitudinally therewith by means of a pin 63 passing diametrically through the bar 37. The pin 63 extends through elongated slots 64 in the driven member so that the sleeve 60 will rotate with the driven member but may have a limited longitudinal movement relative thereto.

The numeral 66 designates an operating handle suitably pivoted as at 67 to a stationary part and having oppositely extending arms 68. To the end of one of these arms is secured a rod 69 passing through a stationary portion of the machine and having at its lower end a foot 70 which, when the rod is moved into lowered position, may be brought into engagement with the cam surface 52 so as to move the cam or sleeve 51 and the bar 37 connected thereto in a direction to throw the clutch members into engagement. For the purpose of preventing knocking or chattering between the foot 70 and the sleeve 51 after the parts have been shifted into the position shown in Fig. 1, it being understood that the driving member 10 rotates continuously, a means is provided for swinging the foot 70 out of engagement with the cam surface 52 without moving the handle 66. This means comprises a sleeve 72 connected by a slot and key-way arrangement 73 to the plunger 69, a pin 74 extending radially from the sleeve, and a tension spring 75 connected between a stationary part of the machine and to the outer end of the pin 74. It will be understood that to shift the sleeve 51 together with the bar 37 from an extreme right hand position to the left hand position shown in Fig. 1, the handle 66 is moved to bring the foot 70 into coöperative relation with the cam surface 52 and this cam surface will wipe against the foot to rotate it in opposition to the spring 75. With this arrangement, after the sleeve 51 has been moved into its extreme position, shown in Fig. 1, the spring 75 will rotate the rod 69 and the foot carried thereby so that the foot will no longer engage the continuously rotating cam 51.

Connected to the other arm 68 of the operating lever 66 is a reciprocating plunger 77 which, when lowered, is moved into the path of the cam surface 61 so as to cause the sleeve 60, together with the bar 37 secured thereto, to move longitudinally in a direction to throw the clutch members out of operation.

For the purpose of moving the carrier 21 longitudinally and thus withdrawing the centering bushing 34 from the recess 33, the bar 37 has a through slot 78 in which is positioned an S-shaped spring 79 the end portions of which frictionally engage against the wall of the bore of the driven member into which the bar 37 extends, so that when the bar 37 is moved longitudinally, the frictional force between the spring 79 and the driven member will cause the driven member to move with the bar 37.

The operation of my improved clutch is briefly as follows; the driving member or shaft 10 is continuously rotated and when the parts are in the position shown in Fig. 1 the slide 31 is maintained in its outermost position by the land 40 so that the clutch parts 24 are forced outwardly and into frictional engagement with the flange 19. To throw the clutch members out of engagement and thus stop rotation of the driven member 14, the operating handle 66 is rocked in a direction to lower the rod 77 into the path of the cam surface 61 whereupon this cam surface will wipe against the rod, causing the sleeve 60 together with the slidable bar 37 to move to the right, referring to Fig. 1. This movement of the bar 37 will move the land 40 out of engagement with the inner end of the slide 31, and at substantially the same time the cam surface 43 will wipe against the end of the dog 46, thereby causing the other end of the dog to rise and move the slide 31 inwardly so that, due to the toggle-links 30, the clutch member comprising the parts 24 will contract. Due to the frictional engagement between the driven member 14 and the spring 79 carried by the bar 37, when the bar is moved to the right, as above described, the driven member will move therewith so as to move the centering bushing 34 out of engagement with the tapering walls of the recess 33 of the disk 18.

When it is desired to throw the clutch members in, the handle 66 is rocked into the position shown in Fig. 1 thereby bringing the foot 70 into engagement with the cam surface of the sleeve 51 which of course was moved to the right when the clutch was thrown out. The sleeve 51 together with the bar 37 are thus moved to the left, referring to Fig. 1, and, due to the spring 79 the carrier 21 will also move so that the centering bushing 34 is brought into engagement with the surfaces of the recess 33. The cam surface 39 of the bar is brought into engagement with the slide 31 causing the slide to move outwardly so that the clutch members 24 are expanded into engagement with the flange 19.

It will be seen from the foregoing description that the power employed in driving the shafts is used to throw the clutch members into and out of engagement and this feature is of particular advantage in large mechines where considerable power is necessary to actuate a movable member, such as a die head of a stamping machine. The operator, to throw the clutch members into and out of engagement, need only rock the lever 66 into the correct position, this requiring practically no exertion and then the actual shifting of the clutch members is done automatically. Furthermore, by employing the power which drives the clutch members, to throw the clutch out of operation the driven member will always be brought to rest in the same position each time the clutch is thrown out. For instance, if my clutch was applied to a stamping machine, the parts may be so adjusted that when the clutch is thrown out the stamping or die head would always stop at the uppermost limit of its stroke, and thus when the machine is again started the head will drop with the same force as if the machine had not been stopped.

In accordance with the provisions of the patent statutes, I have described the principle of operation of my invention together with the device which I now consider to represent the best embodiment thereof but I desire to have it understood that the present disclosure is by way of illustration only and is not to be taken as restrictive of my conception.

I claim as my invention:

1. In a clutch, an expansible clutch member, means for expanding the same, a shiftable member rotatable with said clutch member, and means between said expanding means and shiftable member adapted when the shiftable member is shifted in one direction to move said expanding means in a direction to expand said clutch member and additional means between said expanding means and said shiftable member adapted when the shiftable member is shifted in the opposite direction to move said expanding means in a direction to contract said clutch member.

2. In a clutch, an expansible clutch member, a radially movable slide for expanding the same, a shiftable bar adapted when shifted in one direction to move said slide outwardly and expand said clutch member, and a pivoted member between the slide and bar and actuated by the latter to withdraw said slide when the bar is shifted in the opposite direction.

3. In a clutch, a carrier, an expansible member carried thereby, a radially movable slide, a shiftable bar having a cam surface adapted to force the slide outwardly when the bar is shifted in one direction, and a dog pivoted in said carrier and actuated by said shiftable member to move the slide inwardly when the bar is shifted in the opposite direction.

4. In a clutch, a carrier, an expansible member carried thereby, a radially movable slide, a slidable bar having a cam adapted to move the slide outwardly when the bar is shifted in one direction, said shiftable bar also having a second cam operatively connected to said slide and adapted to move the same inwardly when the bar is shifted in the opposite direction.

5. In a clutch, a carrier, an expansible member carried thereby, a radially movable slide, a shiftable bar having a cam surface adapted to force the slide outwardly when the bar is shifted in one direction, a dog pivoted in said carrier and coöperating with said slide, said shiftable bar having a second cam surface coöperating with said dog whereby to move the slide inwardly when the bar is shifted in the opposite direction.

6. A driving member, a driven member, a clutch between said members and having an expansible clutch member, a shiftable member for actuating said expansible member and rotatable with and longitudinally movable thereof, and a cam connected to said shiftable member and rotatable with one of the first two mentioned members for shifting said member, and means adapted to coöperate with said cam for shifting said shiftable member.

7. A driving member, a driven member, a clutch between said members, a shiftable member for actuating one of the members of said clutch and rotatable with and longitudinally movable of the same, and a cam rotatably secured to each of said first mentioned members and connected to said shiftable member and means adapted to coöperate with said cams to effect shifting of said bar.

8. A driving member, a driven member, a clutch between said members, a shiftable bar for actuating said clutch and rotatable with one part thereof and longitudinally movable of the same, a cam loose on and longitudinally movable with said bar and rotatable with one of said members and a second cam rotatable with the other of said members and with said shifting bar and movable longitudinally with the latter, and means coöperating with said cams to effect shifting of said bar.

BENGT M. W. HANSON.